United States Patent [19]

Flickinger et al.

[11] 4,354,226
[45] Oct. 12, 1982

[54] COMMUNICATION TERMINAL FOR INTERCONNECTING PROGRAMMABLE CONTROLLERS IN A LOOP

[75] Inventors: Charles E. Flickinger, Dousman; Richard C. Born, Wauwatosa, both of Wis.

[73] Assignee: Cutler-Hammer, Inc., Milwaukee, Wis.

[21] Appl. No.: 960,598

[22] Filed: Nov. 14, 1978

[51] Int. Cl.³ .............................................. G06F 3/00
[52] U.S. Cl. ...................................... 364/200; 364/900
[58] Field of Search ... 364/200 MS File, 900 MS File; 179/15 AL

[56] References Cited

U.S. PATENT DOCUMENTS

| | | | |
|---|---|---|---|
| 3,363,234 | 1/1968 | Erickson | 364/200 |
| 3,668,649 | 6/1972 | Pedersen | 364/200 |
| 3,680,056 | 7/1972 | Kropfl | 364/900 |
| 3,688,273 | 4/1972 | Karang | 364/200 |
| 3,706,974 | 12/1972 | Patrick | 364/200 |
| 3,781,815 | 12/1973 | Boudreau | 364/900 |
| 3,806,885 | 4/1974 | Moore | 364/200 |
| 3,879,710 | 4/1975 | Maxemchuk | 364/200 |
| 4,000,378 | 12/1976 | Caplan | 179/15 AL |
| 4,007,450 | 2/1977 | Haibt | 364/200 |
| 4,103,336 | 7/1978 | Gindi | 364/900 |

Primary Examiner—Joseph M. Thesz
Assistant Examiner—David Y. Eng
Attorney, Agent, or Firm—Schroeder, Siegfried, Vidas, Steffey & Arrett

[57] ABSTRACT

A communications terminal for use with a programmable controller to permit transmission of status and control information between that programmable controller and a plurality of programmable controllers having similar communications terminals associated therewith and connected in a communications loop. The communications terminal permits one programmable controller to utilize signals originating in other programmable controllers and to provide asynchronous time division multiplexed signals to other programmable controllers via a shielded, twisted-pair conductor to control devices connected to those other programmable controllers.

15 Claims, 11 Drawing Figures

| FIG.4a | FIG.4b | FIG.4c | FIG.4d | FIG.4e | FIG.4f | FIG.4g | FIG.4h |

Fig. 3

FRAME FORMATS:

| BYTE | SYNCH FRAME | BOX FRAME | FAULT FRAME | COMPUTER FRAME |
|---|---|---|---|---|
| 1. BOX, B1 | 1111 1111 = $FF_H$ | $00 b_5 b_4 b_3 b_2 b_1 b_0$ | 1100 0000 = $C0_H$ | {1100 1111 = $CF_H$ <br> 1101 1111 = $DF_H$ <br> 1110 1111 = $EF_H$ |
| 2. CONTROL, C | 1111 1111 = $FF_H$ | $00 C_5 C_4 C_3 C_2 C_1 C_0$ | 1100 0000 = $C0_H$ | $11 C_5 C_4 C_3 C_2 C_1 C_0$ |
| 3. DATA, D1 | 0000 0000 = $00_H$ | $00 R_{50} R_{40} R_{30} R_{20} R_{10} R_{00}$ | DON'T CARE | $d_7 d_6 d_5 d_4 d_3 d_2 d_1 d_0$ |
| 4. | | $00 R_{51} R_{41} R_{31} R_{21} R_{11} R_{01}$ | | |
| 5. | | | | |
| 6. | | | | |
| 7. | | | | |
| 8. | | | | |
| 9. | | | | |
| 10. | | | | |
| 11. | | | | |
| 12. DATA, D10 | 0000 0000 = $00_H$ | $00 R_{59} R_{49} R_{39} R_{29} R_{19} R_{09}$ | DON'T CARE | $d_7 d_6 d_5 d_4 d_3 d_2 d_1 d_0$ |
| 13. ERROR CHK, E | 1111 1111 = $FF_H$ | $11 e_5 e_4 e_3 e_2 e_1 e_0$ | 1100 0000 = $C0_H$ | $11 e_5 e_4 e_3 e_2 e_1 e_0$ |
| 14. BOX, B2 | 1111 1111 = $FF_H$ | $00 b_5 b_4 b_3 b_2 b_1 b_0$ | 1100 0000 = $C0_H$ | {1100 1111 = $CF_H$ <br> 1101 1111 = $DF_H$ <br> 1110 1111 = $EF_H$ |

COMMUNICATION TERMINAL FOR INTERCONNECTING PROGRAMMABLE CONTROLLERS IN A LOOP

BACKGROUND OF THE INVENTION

The present invention relates to a communications terminal which provides a means for interconnecting a plurality of programmable controllers into a large programmable controller network permitting communication of control information between remotely located programmable controllers. Each programmable controller is associated with a communications terminal, and the communications terminals are connected in a communications loop to form a distributed control system.

An integrated circuit programmable controller which can be readily interfaced with the communications terminal disclosed herein is described in a commonly assigned co-pending application Ser. No. 841,431, filed Oct. 12, 1977.

A programmable controller is a special purpose computer which functions to compute the logic status represented by interconnected contacts, where the contacts are either external (such as relay contacts, limit switches and pushbuttons) or internal. Internal contacts are those controlled by internal coils. The end result of a logic combination is then either placed into an internal coil to energize or de-energize it or is transmitted to the outside to control such external devices as solenoids.

The programming basis of the programmable controller disclosed in the above-identified co-pending application may be termed wire-number programming. That form of programming commences with the assignment of wire numbers to each of the wires connecting nodes in a ladder diagram representation of the electromechanical relay logic. The instructions written by the programmer define the logic connected to each wire number. The programmable controller then determines the status of each wire number and maintains a complete record in an internal memory for that purpose. As shown in that application, the programming method is relatively simple since the result of every logic operation is in memory and the programmer need not keep track of what has and has not been stored. The continuous maintenance of wire number status permits trouble shooting by checking wire numbers in memory. It also permits interconnection of programmable controllers utilizing the communication terminal disclosed herein.

As in the case of conventional programmable controllers, the programmable controller used with the present invention is intended to be located in the vicinity of the external contacts providing input to it and also in the vicinity of the devices being controlled by the programmable controller such as solenoids.

Although fairly large programmable controllers having significant computation capacity can be produced by adding additional elements to the prior art controllers, such large centrally located programmable controllers are relatively inconvenient for use in controlling the operation of a process which involves a number of geographically dispersed external contacts and coils. Using the prior art techniques separate conductor pairs are required to be run from the central programmable controller to each of the remote contact coils.

The communications terminal disclosed herein provides a relatively simple means for providing for the interconnection of a plurality of programmable controllers into a looped distributed control system. The attributes of the communications terminal are such that it can be interfaced with the programmable controller by plugging it into an input/output module slot in a programmable controller. The preferred embodiment shown can be directly plugged into any one of the input/output module slots of the programmable controller disclosed in the above-identified co-pending application Ser. No. 841,431.

The communications terminal disclosed herein is also particularly desirable since its use with a programmable controller is "transparent" to users, meaning that the user of the system generally continues to be able to program the individual programmable controllers as if they were free standing and not interconnected in a looped distributed control system.

The user is able to set up the distributed control system by inserting a communications terminal module in any one of the input/output slots of a programmable controller. After communications terminals have been interfaced with a plurality of programmable controllers, the programmable controllers can in turn be interconnected in a loop using a shielded, twisted pair cable.

Each programmable controller/communications terminal unit, which is referred to herein as a "box" is programmed with an identification number. One of the boxes is designated as a "master" during the initialization and start up of the system. It is necessary that one box function as a master and the remainder of the boxes function as slaves, to provide a smooth automatic start up of the system. After the system has been started up and is running, the master-slave relationship is not necessary, and each of the units functions with the same authority.

OBJECTS OF THE INVENTION

One object of the present invention is to provide a novel communications terminal for use with a conventional programmable controller to permit interconnection of multiple programmable controllers utilizing similar communications terminals into a distributed control system to greatly increase the computational capacity of the programmable controllers while significantly reducing the need for large numbers of wires between the programmable controller and remotely located controlled devices and remotely located sensors and switches.

Another object of the present invention is to provide a distributed control system employing the novel communications terminal described in the above object.

BRIEF DESCRIPTION OF THE FIGURES

The above, as well as the other objects of the invention, will become apparent when reading the following description of the drawings, in which:

FIG. 3 is a chart showing the frame formats for the data handled by the communications terminal.

SIMPLIFIED DESCRIPTION OF THE SYSTEM

Figures 1, 4:
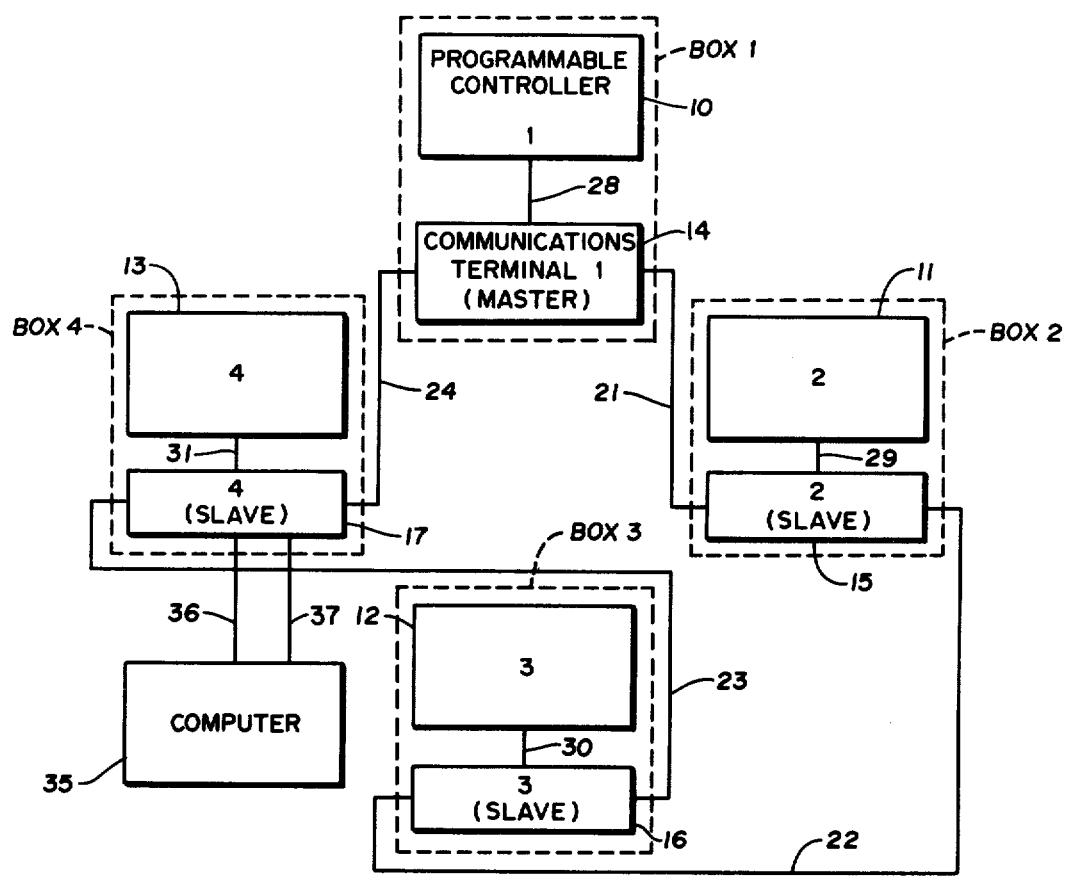
FIG. 1 is a block diagram of a distributed system showing the interconnection of multiple programmable controllers using communications terminals according to the present invention.
FIG. 4 shows their arrangement.

FIG. 1 is a block diagram showing the interconnection of four programmable controllers in a loop using communications terminals according to the present invention. Each of the programmable controllers 10, 11, 12, and 13 is associated with a communications terminal 14, 15, 16, and 17, respectively. The communications terminals are interconnected in a loop with two conductor cables 21, 22, 23, and 24, which may each be up to several thousand feet in length.

Although FIG. 1 shows only four programmable controllers and communications terminals in the loop distributed system, the preferred embodiment shown herein can accommodate up to 40 boxes in the loop without modification, and an even larger number of boxes can be interconnected with a modified terminal without departing from the spirit of our invention.

The combination of each programmable controller and its associated communications terminal is referred to below as a "box". As indicated in FIG. 1, the combinations of programmable controllers 10 through 13, and communications terminals 14 through 17 are designated as boxes 1 through 4, although the system could function equally as well if they were designated as boxes 10, 30, 20, and 35, respectively, for example. The box designations are externally applied and the boxes are not required to be interconnected in any particular numerical sequence.

Communication between the communications terminals and programmable controllers are shown in the simplified block diagram of FIG. 1 as occuring through conductors or channels 28, 29, 30, and 31, respectively, although the specific interconnections between the communications terminals and the programmable controllers are discussed more comprehensively below in connection with the detailed schematic of FIG. 4A through 4H.

Although the preferred embodiment of the communications terminal disclosed herein can be directly plugged into any input/output module slot of the programmable controller disclosed in co-pending application Ser. No. 841,431, the communications terminal can be modified without departing from the invention to be interfaced with other presently available programmable controllers using wire number programming to provide the same communications and interconnection advantages.

FIG. 1 also shows a computer 35 interfaced with communications terminal 17 of box 4 through a connector 36. One or more computers can be interfaced with communications terminals in the distributed loop control system. The terminal shown in the detailed schematic of FIG. 4A through 4H cannot be interfaced with both a programmable controller and a computer as shown, unless the capacity of the T/R Buffer of FIG. 4C is increased, but such a modification can be made without departing from the spirit of the present invention. It is not necessary to include a computer in the system however, since the programmable controller network will operate without any computer being present in the interconnected system.

FORMAT OF DATA IN THE SYSTEM

Figure 2:
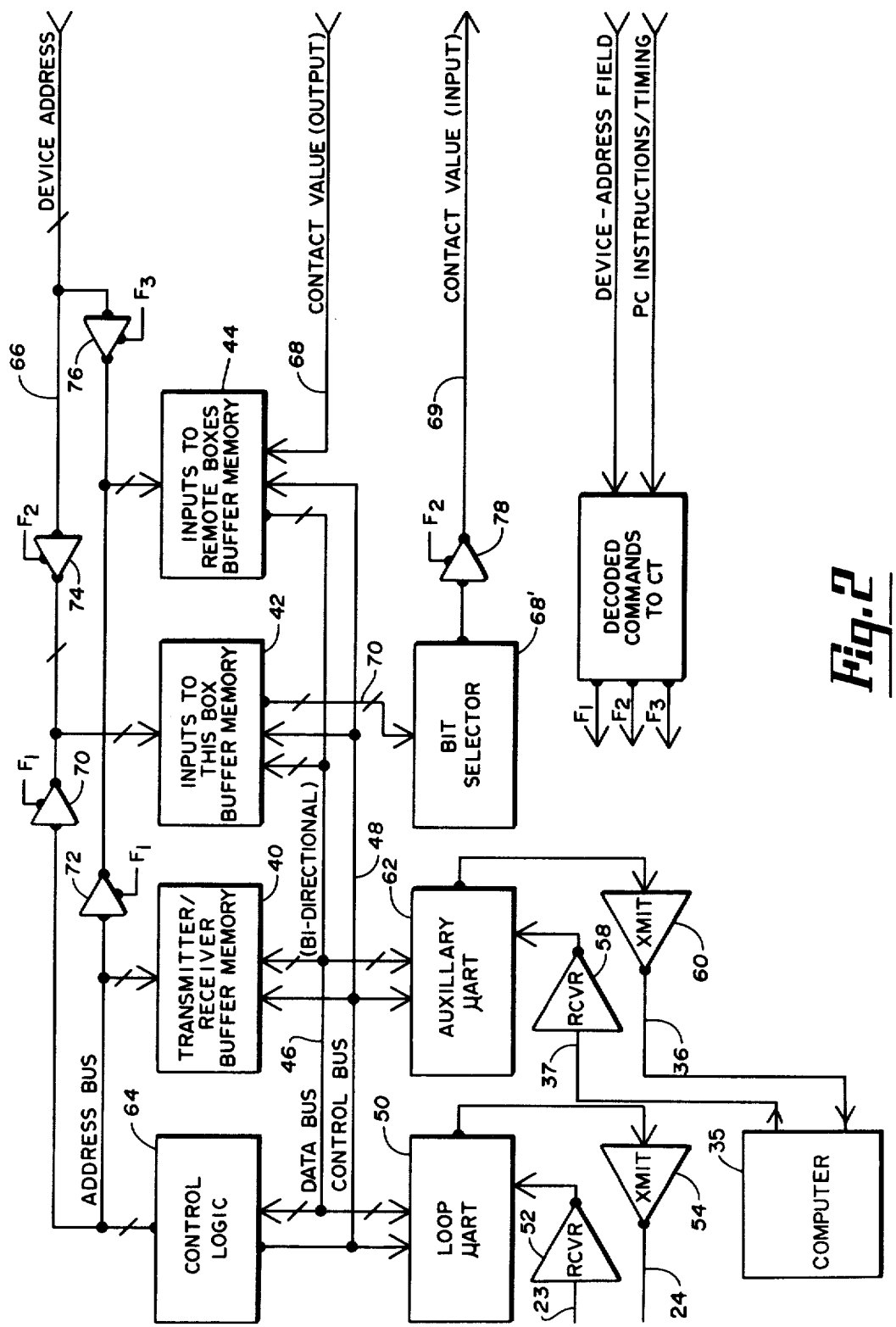
FIG. 2 is a block diagram of the communications terminal.

FIG. 2 is a simplified block diagram of communications terminal 17 of FIG. 1 which is associated with programmable controller 13 to comprise BOX 4 in the loop system. Communications terminal 17 holds up to 60 bits of input information for use by the programmable controller 13. This input information always resides in buffer memory 42, which is shown in FIG. 2 and additionally identified as "THIS BOX" buffer memory. When programmable controller 13 needs a remote input bit, it accesses buffer memory 42 and takes the particular information bit in real time.

In order to fully understand the transfer of information between the communications terminal and the programmable controller, it is first necessary to discuss briefly the organization of information in the programmable controller and the internal timing of the programmable controller.

TIMING WAVE FORMS

FIG. 13 of co-pending application Ser. No. 841,431 shows the timing wave forms of the programmable controller. The F0, F1, F2, and F3 signals all correspond to identically phased signals used in the communications terminal 17. The F0, F1, F2, and F3 periods are the four segments of the programmable controller cycles.

One additional timing signal, WSP, is generated to provide a pulse in the last half of the F3 interval for strobing data into the slot rams and for strobing the box ID into the INPUT PORT on the communications terminal. The WSP pulse is generated in the communications terminal and is a pulse which occurs approximately in the middle of the last half of the F3 interval.

COMMAND WORDS TO PERMIT PROGRAMMABLE CONTROLLER TO BE USED WITH COMMUNICATIONS TERMINAL

There are two special command words necessary in the programmable controller to permit it to be used with the communications terminal for intercommunication in a loop system. The first necessary special command word is the "remote word" command, causing the value of the contact specified by the F2 field in the programmable controller to be transmitted to the box specified by the two least significant characters in the F3 field and, in turn, to the specified box's output coil specified by the F1 field. The wire numbers 900-939 in the F3 field of the programmable controller are reserved for the "remote word" command. A detailed discussion of the programming of the programmable controller appears in the co-pending application Ser. No. 841,431, previously identified.

The other special command word which must be available in the programmable controller permits the programming of the box identification in the programmable controller. To accomplish this, the wire numbers 940-979 in the F3 field in the programmable controller are reserved for the "box identification" command. Specifically, numbers 940-979 define box addresses 00-39, respectively, to characterize each of the boxes in a communications system having up to 40 boxes. Thus, in order to program the programmable controller with the information that its box address is 16, the user of the programmable controller would enter the digits 001 in both the F1 and F2 fields, and the number 956 in the F3 field to designate the box as box address 16. Further circuitry discussed in detail in connection with FIGS. 4A through 4H receives the box identification command and generates the box identification byte for use in the communications terminal.

DATA FRAMES

As shown in FIG. 3, there are four types of fourteen byte data frames that can be transmitted between the communications terminals. In the first column of FIG. 3 is the general description of the data frames. The particular types of frames are the synch frame, the box frame, the fault frame, and the computer frame as shown in the second through fifth columns of FIG. 3.

BOX FRAMES

The box frame is the basic frame used in the system for communication of data between programmable controllers. The box frame contains data in bytes 3 through 11. The first byte identifies the particular box with which the frame is associated and for which the data is intended. Thus, as each frame is received in terminal 17, the first determination made by the terminal is whether the frame is intended for box 4. If the received frame is associated with box 4, the data in the data bytes will be used as remote inputs to its associated programmable controller 13. The remote data was transmitted from other boxes 1, 2, and 3 in the system, having been processed by one of the remote programmable controllers 10, 11 or 12.

The other situation occurs when the box frame received in box 4 does not have an identification which corresponds to the box identification of the box receiving it. In those circumstances, box 4 merely adds its data, where necessary, to predetermined data locations in the frame for use in the box corresponding to the box identification of the frame. The data supplied to the box frame by the terminal is that data from terminal 17 for input to the particular remote programmable controller identified in the initial or box byte.

FAULT FRAME

An additional frame type is the fault frame shown in FIG. 3. The fault frame occurs when there has been an error in the data received. Each data frame is checked for validity by the communications terminal as it is received through a parity check scheme carried out in the loop UART 50. If an error is detected, a fault frame characterized by unique first, second, thirteenth and fourteenth bytes as shown in the fourth column of FIG. 3 is substituted for the frame having the erroneous data. Since the fault frame, by definition, does not carry a box identification byte in the first location, the data frame carrying the erroneous data has been removed from the system. In other words, a frame is present in the system which does not specifically belong to any particular box. Since the frame that was removed had previously been identified with one of the boxes in a system, the removal of that frame results in a situation where one box in the system no longer has an associated box frame. After the fault frame has traveled around the loop to reach the box which no longer has a box frame carrying its box identification, the fault frame will be picked up by that box by means described in more detail below.

COMPUTER FRAME

A fourth type of frame is the frame shown in the fifth column of FIG. 3 for computer interface so that one of the stations in the loop can be a computer. The provision of a special frame for the computer permits the computer to modify information in the distributed system in a programmable way or permits the computer to monitor information being circulated in the system. The first byte is used to identify the particular computer with which it is associated. The computer frame can be configured to command a particular box to permit examination of the status of each of its remote I/O's and the box would supply that information and retransmit it within the computer frame so that the computer frame, when it again reached the terminal to which the computer is connected, could extract the information to monitor it or use it as information input for further processing prior to transmitting new command information out to other boxes. Although the provision for a computer frame and for communication with a computer is shown in this hardware, the details of its operation are not yet fully worked out and are therefore not disclosed in detail herein.

SYNCH FRAME

The synch or synchronizing frame shown in the second column of FIG. 3 is used during the initialization and start up of the system. As shown in FIG. 1, box 1 comprised of programmable controller 10 and communications terminal 14 is designated as a master. As indicated previously, this designation of one of the units as a master and the other units as slave can be accomplished by setting a switch (or inserting a jumper) on the communications terminals in each box. The single master unit in the loop communications system initiates the operation of the system by transmitting a synch frame having the specific configuration shown in FIG. 3.

The purpose of the synch frame is to establish communication between the terminals within the loop. The master station transmits the synch frame and awaits receipt of the synch frame after it has been received and retransmitted by each of the terminals in the loop. The master then replaces the first synch frame that it receives back with its box frame. Then as each slave station receives the master box frame it will retransmit it and then grab the next synch frame for its box frame. Each slave station treats the synch frame received as its box frame and transmits it on the line with its box identification placed in the first byte of the frame. The slave also transmits all zeros in its data bytes 3 through 12. Subsequent synch frames received after a box has transmitted its own box frame are transmitted without alteration. After the start up has been completed, there is no longer any distinction between the master and slave boxes. Also, there should not be any synch frames left on the loop.

BOX AND CONTROL BYTES

The box frames shown in the frame format chart of FIG. 3 all carry a first byte or box byte with the ID for the box (or the computer in the case of the computer frame). The second byte is a control byte which is used as a counter which is reset to 0 each time the frame is transmitted from the box identified in the box byte. Each time the box frame is received at the next box in the loop, the control byte is indexed a single count before it is retransmitted. Since the maximum number of boxes in a loop is 40, the indexing of the count in the control byte of the frame beyond 39 indicates the existence of a problem since the control byte was not updated by the box identified in the box byte. Thus, the control byte is set to 0 by the box whose ID corresponds to the BOX byte and is incremented by one count by each other box in the system as it moves around the loop. Once the count in the control word gets to 40, it is no longer incremented. The meaning of a box frame in the system with a control count of 40 or more is, for example, suggestive of a situation where a box has been removed from the loop during the processing of a box frame associated with a different box. Such an occurance would initially take the frame associated with the other terminal out of the sequence of data frames being transmitted while its own box frame remained in the loop. Since its own frame would never be reset to 0, the count in the control byte of that frame would eventually reach 40. Receipt of that box frame with a control byte having a count of 40 would indicate to the first box receiving it which requires a new frame that the frame is open and can be utilized.

An open frame corresponds to a fault frame. In other words, once the count in the control byte reaches 40, the first station to detect that condition will substitute a fault frame for the detected box frame, and the first box which no longer has its associated frame circulating around the loop senses that condition by counting the number of frames it has received without receiving its own box frame and takes the first fault frame received and converts it to its own frame by putting its box identification in the first byte and setting the control byte to 0. Thus, at any given time the number of box frames in the loop system corresponds to the number of boxes in the system, and the system automatically deletes transmission of data frames associated with boxes which have been removed from the system.

DATA BYTES

As indicated in FIG. 3, the data is carried in bytes 3 through 12 of the frame. Each byte has two initial zeroes followed by six data bits. Thus, it is possible to transmit 60 remote I/O bits per box. In other words, remote boxes of the system can pass up to 60 remote I/O bits to a particular box for use by its programmable controller. Using the terminology in co-pending application Ser. No. 841,431, the data is organized in six possible "slots" and 10 "elements" per slot. As indicated in FIG. 3, in the first data byte, there occur all of the element 0 bits for slots 0, 1, 2, 3, 4, and 5. Thus, the numbering is 0-5 for the slots. The next data byte has the data for all of the element one slots. The two initial zeroes shown in the data bytes of the box frame of FIG. 3 could be utilized as data bits also. This would increase the capacity from 60 to 80 remote I/O bits per box. Additional data bytes would be necessary to expand the capacity beyond 80 remote I/O bits per box.

ERROR CHECK BYTES

The final bytes in the frame format are the error check byte and box byte, as shown in FIG. 3. Thus, the first and last bytes of the frame are always the same and are checked for that condition as received in each box. The entire 14 bytes of the frame are loaded byte-by-byte into receive buffer 40 after their parity is checked in loop UART 50. Before any use is made of the information in the terminal 14, the first and final bytes are checked by control logic 64 to verify that they correspond. If they fail to correspond, a fault frame is generated.

The thirteenth byte, the error check byte, serves as a check byte over the previous 12 bytes. Thus, the error check byte is a check sum of the first 12 bytes. Again, as the frame is received in each terminal, it is checked by using control logic 64 to independently form a check sum for the first 12 bytes received. That check sum is then compared to the transmitted check sum in the 13th byte received with the frame. If they fail to correspond, a fault frame is generated.

In addition to the checking for agreement between the first and last bytes, and performing the comparison of the computed check sum to the transmitted check sum, the terminal checks individual bytes as they are received to ascertain that they have the correct parity. A ninth bit is transmitted with each byte, but is not specifically shown on the frame formats of FIG. 3. That ninth bit is the parity bit. Each box receiving data bytes checks their parity in UART 50, as received vs. the parity transmitted. Where the parity of the received byte does not compare to the parity transmitted, the initial zeroes of such data bytes can be reset to a 01, for example, to indicate the detection of an error in that particular byte.

SIMPLIFIED BLOCK DIAGRAM OF TERMINAL

As indicated in FIG. 2, terminal 17 contains three memories, 40, 42, and 44, in addition to the memory registers associated with control logic 64 and UARTs 50 and 62. The transmitter-receiver buffer memory 40 is connected via data bus 46 and control bus 48 to the remainder of the elements in the terminal. Transmitter-receiver buffer 40 stores the data frame received by terminal 17 from the loop UART or universal asynchronous receiver and transmitter 50 which in turn receives its input from receiver 52 which is connected to an input conductor 23 in FIG. 1 and is connected through a transmitter 54 to a 2-conductor cable 24.

In box 4 in the block diagram of FIG. 1, an auxiliary computer 35 is shown connected via input bus 37 and output bus 36 through receiver 58 and transmitter 60 to auxiliary UART 62, which is identical in its operational aspects to the loop UART 50. The auxiliary UART 62 permits communication between the auxiliary computer 35 and communications terminal 17, and through that terminal, to the other communications terminals 14, 15, and 16 in the loop of FIG. 1.

UART 50, in FIG. 2, receives data from conductors 23 and passes the data frame to transmitter-receiver buffer memory 40 via data bus 46. As data is being received from conductors 23 into loop UART 50 and transferred to appropriate locations in the transmitter-receiver buffer memory 40, the UART may be simultaneously transmitting on conductors 24 a frame which was stored in appropriate locations in transmitter-receiver buffer memory 40 for retransmission to the loop. Thus, UART 50 is capable of both transmitting and receiving at the same time. Loop UART 50 receives data in bit serial form. After receipt of a byte of information, the byte is transferred on data bus 46 into the receiver portion of buffer 40. The transmitter portion of buffer 40 is used to store the frames being transmitted under control of control logic 64.

After receipt of an entire frame in the receiver-buffer memory 40, several checks of the frame are performed by control logic 64. The initial and final bytes of the frame are checked to determine whether it corresponds to the box I/D of the terminal receiving it. If it does correspond, and if there are no parity errors and the check sum is correct, the data is then loaded into the THIS BOX buffer memory 42, which is the buffer memory used for storage of remote I/O data for programmable controller 13 associated with the terminal 17. It is the remote I/O memory 42 which is constantly being read by the programmable controller 13 by way of device address bus 66, which addresses particular locations in the remote I/O buffer memory 42 to deliver a particular data byte to bit selector 68' by the way of data bus 70. In such situations, the programmable controller has priority over communications within the communications terminal. Whenever the programmable controller requires a byte from the communications terminal 17 it will interrupt communications in that box and read out the byte that it needs from the I/O buffer memory 42 and receive the selected bit on its internal bus 69.

If the data frame received has a box ID in the first byte which does not correspond to the identification of the particular box 17 receiving it, that received frame is held in the receiver buffer and updated in appropriate locations with data intended for that box by the programmable controller 13 associated with terminal 17. Data from programmable controller 13 associated with each of the remote programmable controllers has previously been stored in the remote boxes buffer memory 44 after being loaded therein through conductor 68 from the programmable controller. Loop UART 50 then retransmits the data frames having box IDs not corresponding to the box ID of terminal 14 after taking the information stored in the receiver portion of buffer memory 40 and updating it with the information intended for the box identified in the box ID for that frame.

In order to achieve a configuration for the terminal circuitry which will permit the programmable controller to always have priority over the communications within and between terminals, FIG. 2 shows tri-state gates 70, 72, 74, 76, and 78, associated with the programmable controller device address bus 66, the programmable controller input bus and the control logic address bus. The individual tri-state gates function as follows. Gate 78 is used to enable the reading out of the remote bytes from the remote I/O buffer memory 42 at the correct time in the timing sequence. This is denoted by the function F2 used to actuate the gate. The functions F1, F2, and F3 are specific timing functions discussed above and shown in detail in FIG. 13 of co-pending application Ser. No. 841,431, identified more fully above. The remaining tri-state gates 70, 72, 74, and 76 are utilized to resolve any conflicts which would occur between the control logic 64 of terminal 17 and programmable controller 13 and to assure programmable controller access to the communications terminal.

The timing signals function as follows. During interval F1, control logic 64 is permitted access to memory elements 42 and 44. During timing intervals F2 and F3, the programmable controller may need access to memory elements 42 and 44 and tri-state gates 70, and 72 block control logic 64 from gaining access to memories 42 and 44 except during interval F1. Thus, the possibility of contention between control logic 64 of the communications terminal and the associated programmable controller is resolved by giving the programmable controller exclusive access to the memory buffers 42 and 44 during time intervals F2 and F3 of the programmable controller operating cycle. The programmable controller, therefore, has access to the memories in the communications terminal during each complete cycle of programmable controller operation, whether the access is needed or not. Also, on every programmable controller cycle, the F1 portion of the cycle is also dedicated for use by the communications terminal control logic 64. Since the programmable controller cannot use information from the communications terminal during that segment of the programmable controller's cycle, there is no delay of the operation of the programmable controller due to the allocation of a specific period for the operation of the terminal functions.

DETAILED SCHEMATIC OF COMMUNICATIONS TERMINAL

Although the block diagram of FIG. 2 is adequate for description of the operation of the communications terminal, some of the features of the system can best be understood by reference to the detailed schematic diagram in FIGS. 4A through 4H. The detailed schematic shows a number of commercially available functional circuits shown in block form with the pin designations specified by the manufacturer. Unless otherwise specified, the circuits are designated by their RCA designations although functionally equivalent circuits may be available from Hughes and others under different identification numbers.

In the detailed schematic, the various multiple conductor busses are shown with only two conductors explicitly shown. The address bus is an eight conductor bus with its various conductors designated A0, A1, A2, etc. The data bus is an eight conductor bus whose various conductors are designated D0, D1, D2, etc.

In addition to the explicit identification of pin numbers on the commercial circuit elements, one or more alpha numeric characters describing the function of those terminals are also indicated within the outlines of the circuits. The alphanumeric descriptive terms generally correspond to those used by the manufacturers of the circuits.

The various input signals to the circuit elements may also be labelled with alphanumeric characters. Those characters which are enclosed in a circle or a box indicate that the particular signal either originated in or is to be delivered to the programmable controller. Those input signals which are not enclosed originate within the communications terminal. The inter-connection of most, but not all, of those signals is explicitly shown.

Figure 4A:
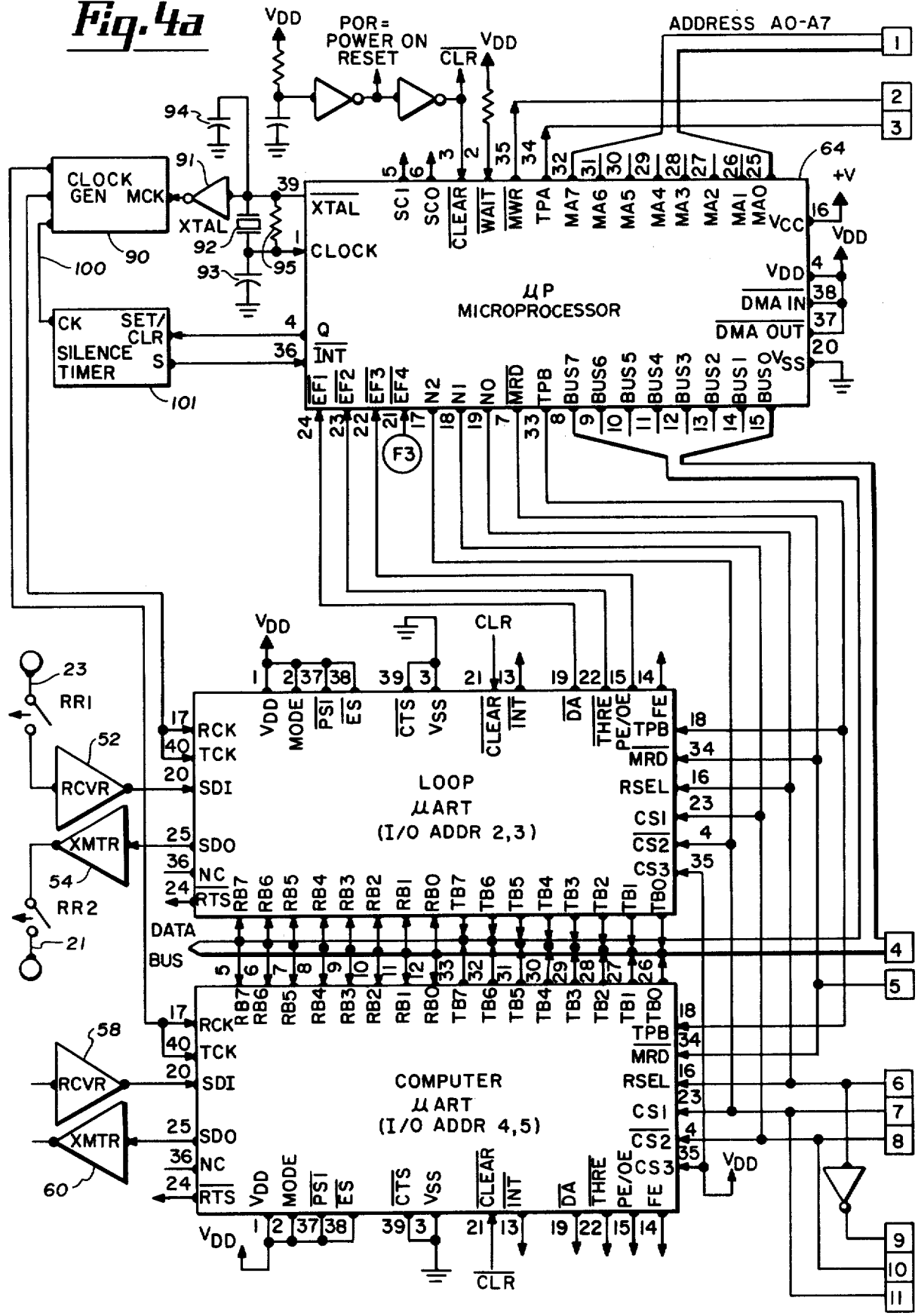
FIGS. 4A through 4H are a detailed schematic diagram of a communications terminal.

Turning now to the detailed schematic of FIG. 4, and turning specifically to FIG. 4A, receiver 52 is shown receiving its input from conductor pair 23 through reed switch RR1, and having its output connected to data input terminal 20 of the loop UART. The data output terminal 25 of the loop UART is connected to the input transmitter 54, which delivers its output through reed switch RR2 to conductor pair 24. In an entirely analogous manner, receiver 58 and transmitter 60 are connected to the computer UART which corresponds to the so-called auxiliary UART 62 shown in FIG. 2. Both the loop UART and computer UART are CDP 1854 UARTs manufactured by RCA. The UARTS are operated in mode 1 as described in the RCA Cosmac Micro-Processor Product Guide, MPG 180, published by RCA Corporation in 1977. The mode 1 operation of the UARTs makes them suitable for direct interface with control logic 64 as shown in FIG. 2. As indicated previously, the terminal shown in FIGS. 4A through 4H is to be connected to a programmable controller or to a computer but not to both simultaneously.

CONTROL LOGIC

The control logic 64, or micro-processor, as shown in FIG. 4A is an eight bit CDP 1802 micro-processor.

Although FIG. 4A shows mechanization of control logic 64 in the form of a micro-processor, it will be realized that the control logic could alternatively be mechanized with conventional logic elements without departing from the spirit of the invention.

Both the loop and computer UARTs receive at their terminals 17 and 40, the receive and transmit clock signals, which are generated by a clock generator 90, which is driven by an inverter 91, which is in turn driven by a clock generating circuit comprised of a crystal 92, a pair of capacitors 93 and 94, and a resistor 95 connected in parallel across crystal 92. The serial data entering the UART on terminal 20 is received in an internal shift register and transferred to an internal receiver holding register. A multiplex circuit is then utilized on command to transfer the data in parallel to the data bus positions D0–D7 from the receiver buffer terminals designated RB0 through RB7 in FIG. 4A. In a similar manner, data received in the loop UART from data bus positions D0–D7 connected to transmitter buffer terminal designated TB0 through TB7 on the loop UART is loaded into the transmitter holding register in the UART and is then passed to the transmitter shift register where a parity bit is added and the byte is shifted out of the UART from terminal 25 through transmitter 54 to conductor 24 and the loop.

Figure 4B:
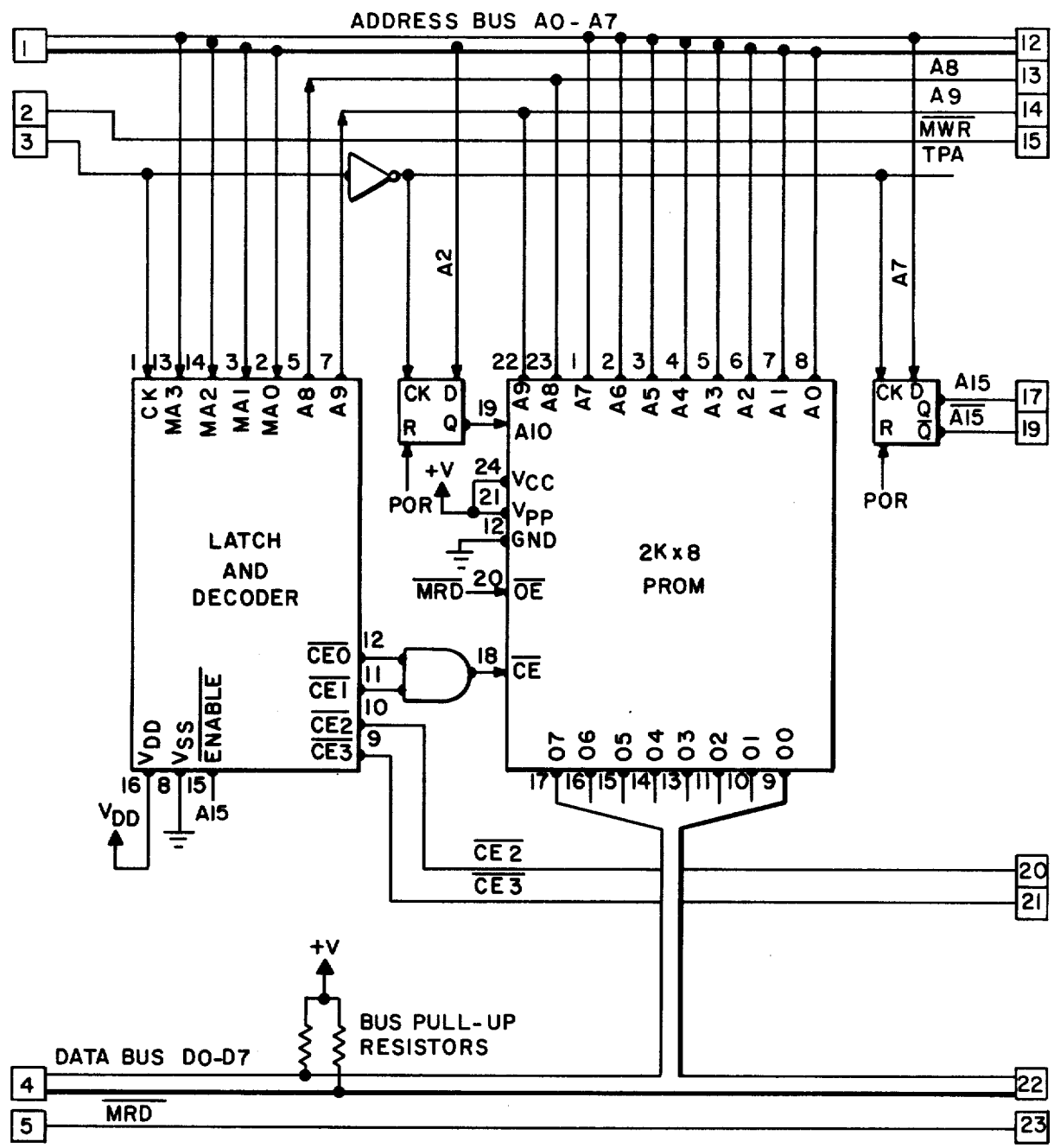
Figure 4C:
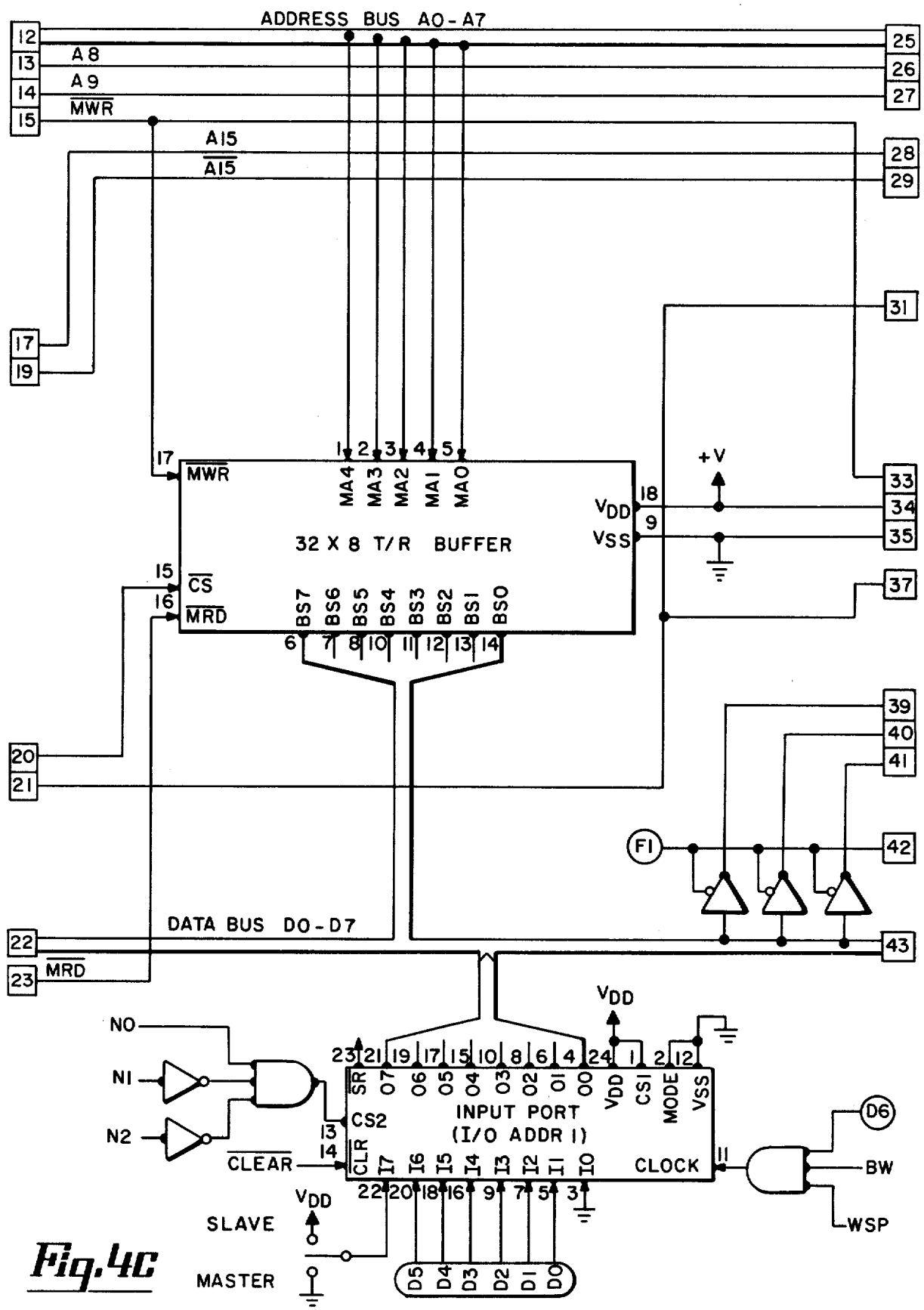

The control logic of the communications terminal is provided by the CDP 1802 micro-processor and its control program which is stored in the 2 K by 8 PROM memory shown in FIG. 4B. The clock for the microprocessor is provided by crystal 92, which is connected to the XTAL and clock inputs at terminals 38 and 1, respectively, of the micro-processor. The clock generator 90 is a circuit used to divide down the crystal frequency used by the micro-processor to supply the correct clock frequency to the UART. The clock frequency for the micro-processor is 2.4576 megahertz, as established by the crystal 94. The frequencies available from clock generator 90 allow operation of the UART at frequencies such as 4.8 kilobaud, 9.6 kilobaud, 19.2 kilobaud, and 38.4 kilobaud, depending upon the distances desired between boxes and other similar matters of design choice. The clock generator also provides on conductor 100, a clock input to silence timer 101, shown in FIG. 4A, which is used in the preferred embodiment to generate a two millisecond period of silence between successive data frames, so that at the end of a received frame, and before the commencement of the transmission of a new frame, the communications terminal and its programmable controller have time to process the frame previously received.

The silence interval also is an efficient time to switch new boxes into the system so that a minimum of interference will be generated to the data frames in the loop as a new box is added to the loop. This is accomplished by enabling the receiver of the box to be inserted on the line, and determining whether the silence interval is being received and, if it is, inserting the new box on the loop during the silence interval by immediately closing the switch RR2 between the transmitter and the loop communication line. This is performed under the supervision of control logic 64.

FIGS. 4B through 4G show a number of memory elements forming the memories 40, 42, and 44 of FIG. 2. When it addresses a memory unit, the micro-processor generates out a 16 bit address which is multiplexed onto the memory address bus. In the preferred embodiment shown, at the beginning of each micro-processor cycle, part of the top eight address bits, are latched into the CDP 1859 latch decoder shown in FIG. 4B, where the bits are stored and transmitted onto lines A8 and A9 when the low order address bits from the micro-processor are delivered to busses A0 through A7.

The 2 K and 8 PROM memory shown in FIG. 4B is used to store the control program for the micro-processor control logic and is part of the control logic 64 shown in FIG. 2.

The designation of a particular controller as either master or slave in the loop communication shown in FIG. 1 is accomplished by means of a switch as shown in FIG. 4C. Terminal 22 of the input port, a CDP 1852 I/O port is connected to the VDD, or approximately 6 volts if the terminal is to function as a slave unit, and is connected to zero volts if it is intended to function as a master unit. As explained above, the master-slave terminology only has relevance in connection with the initialization or start up of the loop communications system. After the loop is in operation, there is no operational distinction between master and slave terminals.

The box identification for each of the terminals is stored in the memory of the programmable controller. Thus, when the programmable controller is coded, it must include a special command word identifying the box in the system. Thus, in terms of FIG. 1, the programmable controller 13 designated as number 4 will have coded in its memory a box ID of 4. Similarly, programmable controllers 10, 11, and 12, will be coded as boxes 1, 2, and 3, respectively. The input port is gated by the WSP, or write strobe pulse, the box word or BW logic signal, and D6 from the programmable controller. The BW logic command is generated by the circuitry shown at the lower right hand corner of FIG. 4H. The BSC1 signal shown corresponds to the $C_1$ signal shown in application Ser. No. 841,431, and BCS3 corresponds to $C_3$. The box identification word is read from the programmable controller onto the communications terminal data bus and into an internal data register in the micro-processor for later use in comparing the box ID to the first byte of a received frame to determine whether the received frame is intended for the box receiving it, or is intended for another box.

BUFFER FOR INPUTS TO LOCAL
PROGRAMMABLE CONTROLLER

Turning now to FIG. 4C, the 32×8 T/R buffer is the transmit and receive buffer corresponding to element 40 in FIG. 2. The buffer utilizes an RCA CDP 1824 32×8 RAM memory, as does the remote I/O ram or buffer shown in FIG. 4D, which corresponds to the buffer memory 42 of FIG. 2. As indicated previously, the remote I/O memory 42 is the memory that holds the remote outputs for any given box or for the programmable controller forming a part of that box. The information stored in this memory is the data to be passed to programmable controller 13 from the remote boxes in the looped communication system, and is taken from the "THIS BOX" buffer memory in real time by the programmable controller at the point in the programmable controller operating cycle when the data is needed. Sixty bits of such data are stored in the embodiment shown.

Figure 4D:
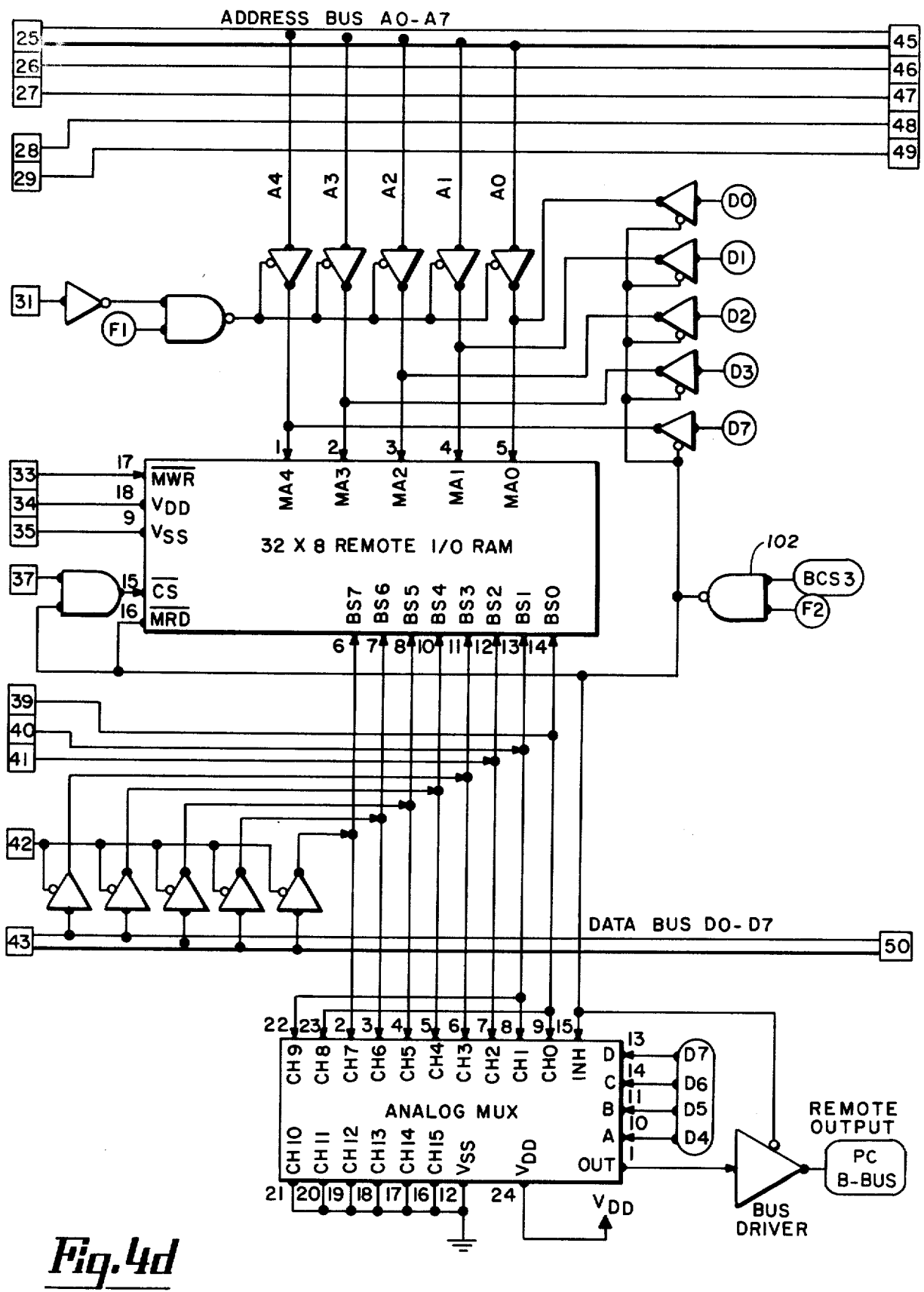

Referring briefly now to FIG. 3, showing the data frame format, the data in bytes 3 through 12, designated in the first column as D1 through D10, is stored in the remote I/O RAM of the FIG. 4D in the same format. Namely, the byte designated D1 is stored in word zero, the first word, so that if the programmable controller associated with the terminal wanted to read out bit zero of slot three, it would have to provide a slot address and a byte or an element address. The element address in this case would be zero. If the slot address were a three and the element address a zero, the terminal would read out word zero from the remote I/O RAM into the analog multiplexer shown at the bottom of 4D, a type 4067 16 channel analog multiplexer/demultiplexer manufactured by Fairchild Semiconductor and others. Thus, the entire six bits of data for the selected byte would be read out and the analog multiplexer would be used to select one of those six bits for use in the programmable controller.

When the local programmable controller requires a bit, it supplies the element and slot address. The data byte for the element is read out of the remote I/O RAM to the analog multiplexer and selection of the slot address is made by the analog multiplexer. The output of the analog multiplexer at pin 1 is delivered to a bus driver amplifier indicated in FIG. 4D and onto what is designated as the PC, or programmable controller, B bus, a data bus internal to the programmable controller. The bit is then utilized by the programmable controller in exactly the same manner as if it had been in the programmable controller internal memory or was from a local input.

The analog multiplexer corresponds to bit selector 68', shown in FIG. 2, while the bus driver corresponds to the gate 78 and receives its control signal from gate 102 on FIG. 4D, which receives an F2 timing signal input, as well as the programmable controller control signal BCS 3. Access to the communications terminal by the programmable controller for a needed bit of data is made in real time, with the programmable controller having priority over the operations in the terminal.

BUFFER FOR INPUTS TO REMOTE PROGRAMMABLE CONTROLLERS FROM LOCAL PROGRAMMABLE CONTROLLER

Figure 4E:
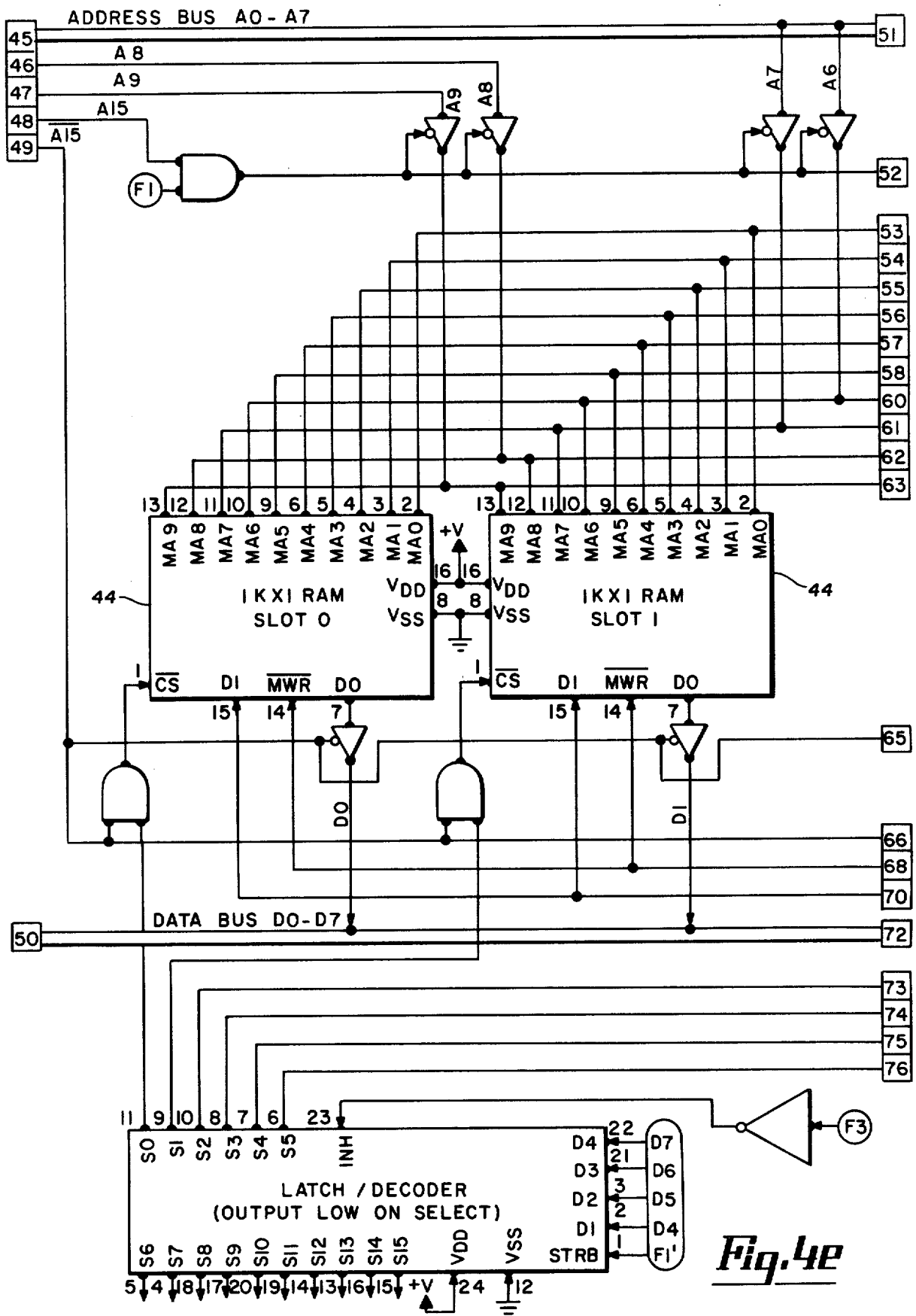
Figure 4F:
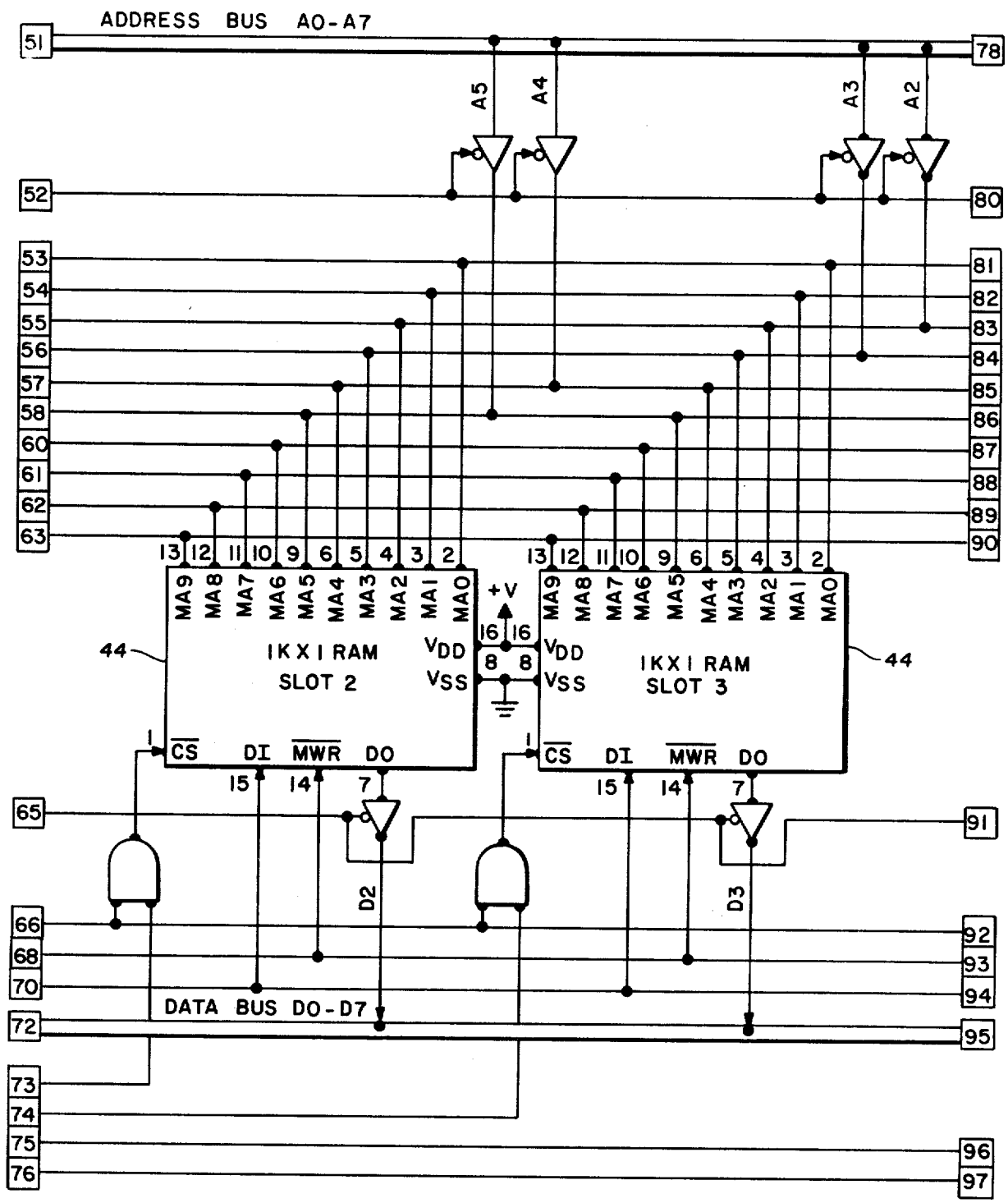
Figure 4G:
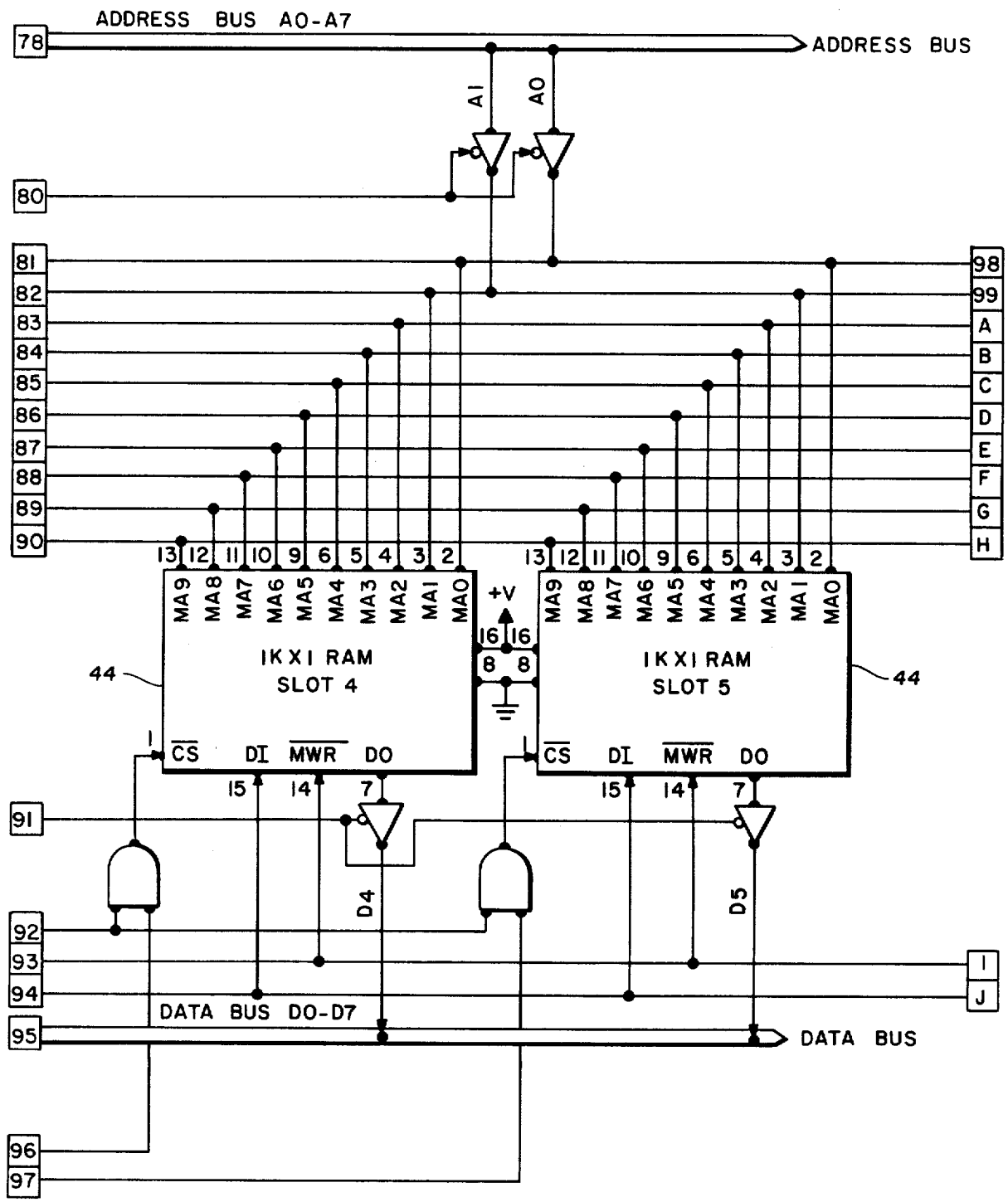

FIGS. 4E, 4F, and 4G each contain two one thousand bit (type 1821, having 1024 bit capacity) random access memories which store the remote data supplied by box 4 for some other box in the system. Thus, the programmable controller 13 associated with box 4 must be able to write into these RAMs the data which is to be transmitted to other programmable controllers in the system. Periodically the values stored in these RAMs will be read out by the micro-processor and put into the data frame for the programmable controller for which they are intended by the 32×8 T/R, or transmit-receive buffer, shown in FIG. 4C. The 6-bit data byte that is being updated is read out of the six slot RAMs, designated slot zero through 5 in FIGS. 4E through 4G, then put into a frame that has been received. The actual updating of the received data frame takes place during the two millisecond silence interval which occurs between data frames. At any particular point in time when programmable controller 13 reaches a point in its program where it is required to update a data byte, it has access priority to the RAMs during periods F2 and F3, and is able to do so without waiting for other processing to be completed in the terminal. Thus, the micro-processor in the terminal is required to do its operation on the slot RAMs during the F1 period when the programmable controller does not require data or have data for transmission to a remote programmable controller.

The data is stored in the RAMs according to a particular format. The remote bytes for the box designated as box 1 are stored in words 16-25, for example. For each of the boxes 0-39, there is a corresponding section in the RAM memory for the storing of its associated data. Each box has, in fact, a reserved section of 16 words, only 10 of which are normally used, and those 10 words, being six bits each in length, give 60 bits of information for each box. In actual application, many of the byte locations are not used because the particular box or more specifically, the particular programmable controller associated with the terminal may only supply a few remote inputs for the remainder of the system. If a box supplies only two remote bits for the whole system, it uses only two bits in the entire array of slot memories. Each time those locations are checked by the programmable controller, it will update their status in the slot RAMs.

If programmable controller 13 and its communications terminal 17, shown in FIGS. 4A through 4H, is designated as box 4 and it supplies remote signals to box 1, the receipt of a box 1 frame in box 4, causes the values supplied by box 4 to be read out of the slot RAM and inserted into the frame for box 1. The information is read out of the slot RAM and into the transmit-receive buffer shown in FIG. 4C for transmission in the data frame.

The updating is accomplished by taking the data for the remote location from the slot RAM and loading it into the receive buffer in the proper locations during the silence period between frames. Thus, if the terminal is box 4 and has the box 1 frame in the receive buffer, that frame is updated by whatever remote I/O information the programmable controller 13 associated with that terminal has stored for transmission to box 1. After the updating is done during this silence interval, the frame is transmitted to the next box with updated values from box 4.

The latch/decoder shown in FIG. 4E is a 4515 commercially available circuit which selects one of the six slot RAMs for writing at any particular time since only one bit is to be updated at a particular time. Thus, a decision must be made during updating as to the identification of the RAM in which the desired bit is located and also the location within the RAM. This is accomplished by selecting the proper slot RAM using the latch/decoder. The latch/decoder receives input signals from the programmable controller designated D7, D6, D5, and D4, shown as inputs to the latch/decoder at the bottom of FIG. 4E. These four signals permit selection of the desired one of the six RAMs to be accessed.

Figure 4H:
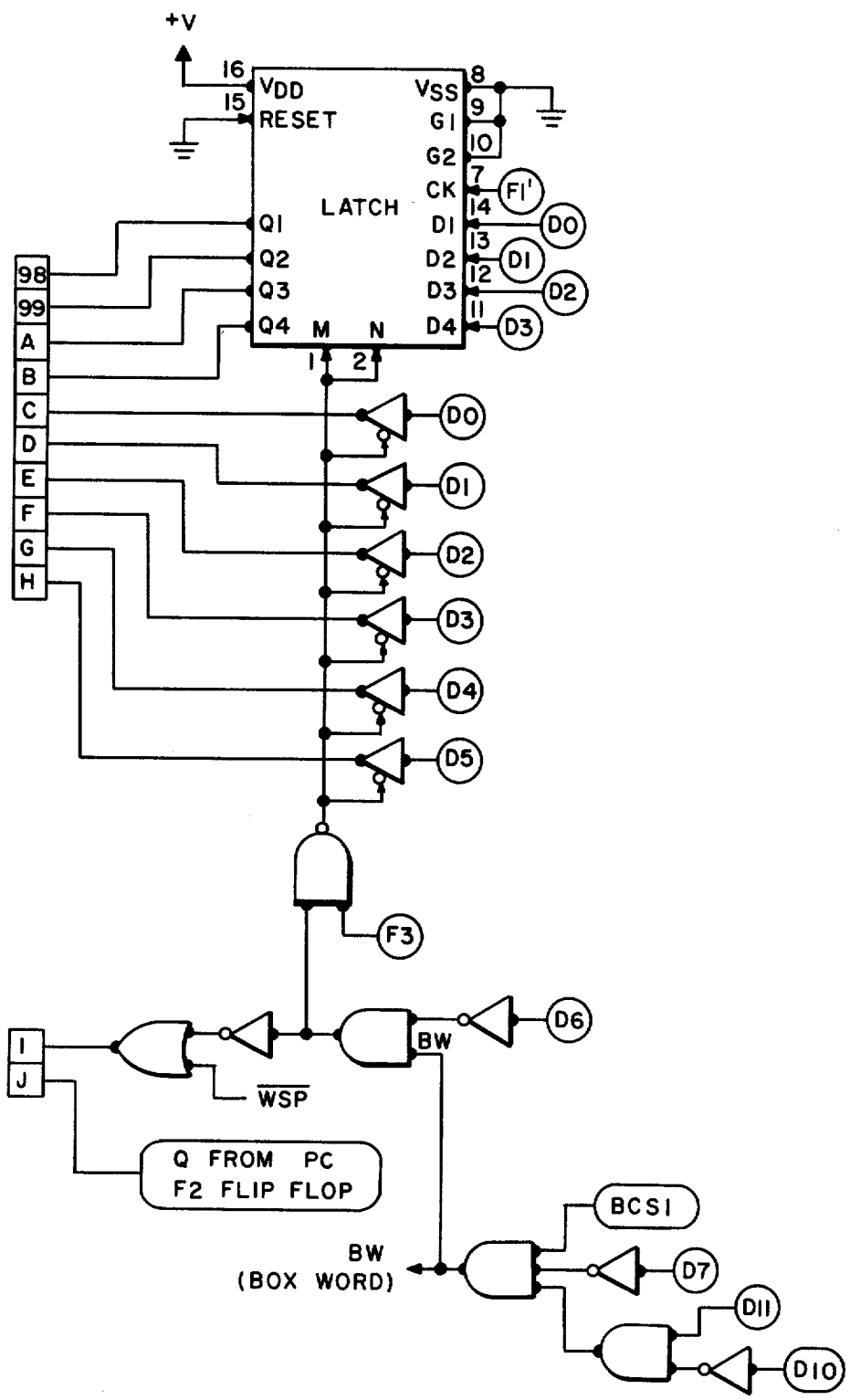

Selection of the area in the memory of a particular slot corresponding to a particular box is done by the programmable controller with the six bits, D0 through D5, from the programmable controller, and shown as inputs in FIG. 4H. Those six bits select the box I/D area. In recalling that the box I/Ds can reach from 0-39, it is noted that six bits are all that are necessary to characterize a box I/D. Thus, the top six bits of the ten bit address for the slot RAMS are defined by D0 through D5 to define the area unique to the box and within that area unique to the box, the output of a 4076 latch receiving programmable controller inputs D3, D2, D1, and D0, selects the particular element. If we were attempting to locate element zero of box 30, the circuitry would select the area corresponding to box 30 and go to the word zero within that area.

The micro-processor has a similar capability to select bytes from the RAMs. It can select bytes in much the same way as the programmable controller, but only during the F1 protion of the programmable controller timing sequence where the programmable controller does not require access to the slot RAMs. It reads out all six bits at once, by selecting the same word and the same bit in all six slot RAMs.

We claim:

1. A terminal for providing real time intercommunication of digital data between an associated programmable controller and N other programmable controllers, each of which is associated with a similar terminal, said terminals interconnected in at least one closed loop by transmission of N+1 frames of serial digital data which continuously circulate around said loop, each of said frames being identified with one and only one of said other programmable controllers, each of said frames being updated with information from the N other terminals in the loop as it makes one complete cycle of the loop and each of said frames updating the programmable controller with which it is identified when received by the terminal associated therewith, said terminal comprising, in combination:

receiving means connected to said loop for receiving therefrom input frames of digital data containing one or more data bytes of information relating to programmable controllers in said loop;

transmitting means connected to said loop for transmitting output frames of digital data thereto;

first buffer memory means for storing a frame of data;

first control means connected to said receiving means and first buffer memory means for transferring data from said receiving means to said first buffer memory means;

second buffer memory means connected to said associated programmable controller for delivering to said associated programmable controller bytes of stored data received from the frame of serial digital data associated with the terminal and which were originated by other programmable controllers thereto, the delivery of said stored data being under control of said associated programmable controller;

third buffer memory means connected to said associated programmable controller for receiving bytes of updated information therefrom for transmission to said other programmable controllers in frames associated with said other programmable controllers;

second control means connected to said first and second buffer memory means for transferring bytes of data for said associated programmable controller from said first buffer memory means to said second buffer memory means when the received input frame of digital data is identified with said associated programmable controller;

third control means connected to said first and third buffer memory means for transferring bytes of data for said other programmable controllers from said third buffer memory means to said first buffer memory means when the received input frame of digital data is not identified with said associated programmable controller; and fourth control means connected to said first buffer memory means and said transmitting means for transferring data from said first buffer memory means to said transmitting means for transmission of N output frames not identified with said associated programmable controller, said output frames corresponding to said input frames updated with information for N other programmable controllers, said fourth control means transmitting an output frame identified with said associated programmable controller to be updated by said other terminals.

2. The invention claimed in claim 1 wherein each of said data frames is comprised of at least one data byte and a data identification byte which identifies the programmable controller which will receive the data byte of that data frame.

3. The invention claimed in claim 2 wherein said terminal also includes:

box identification byte generating means for receiving box identification information stored in said programmable controller and generating a box identification byte;

further control means for comparing said box identification byte to said data identification byte to enable said second control means to transfer data from said first buffer memory means to said second buffer memory means when said box identification and said data identification bytes are identical and to enable said third control means to transfer data from said third buffer memory means to said first buffer memory means when said box identification and said data identification bytes are not identical.

4. The invention claimed in claim 2 wherein said data identification byte occurs at least twice in said data frame and wherein said terminal also includes:

first error checking means for comparing the identification bytes stored in said first buffer memory means and for generating a frame error indication when said identification bytes are not identical.

5. The invention claimed in claim 4 wherein said terminal also includes:

error frame generating means responsive to said frame error indication generated by said first error checking means to effect substitution of an error frame having specified characteristics for said data frame prior to said transmitting means transmitting the data frame containing said frame error to said closed loop.

6. The invention claimed in claim 5 wherein said terminal includes:

fifth control means responsive to said error frame checking means to prevent said second control means from transferring data from said data frame to said second buffer memory means when an error frame is stored in said first buffer memory means.

7. The invention claimed in claim 1 wherein each of said data frames is followed by a silence interval of a predetermined time duration prior to transmission of the next of said data frames.

8. The invention claimed in claim 7 wherein said terminal also includes:

sixth control means for inhibiting operation of said terminal when it is newly connected into a closed loop until said receiving means detects the reception of said silence interval at the completion of said data frame.

9. A terminal for providing intercommunication or digital data between an associated programmable controller and N other programmable controllers, each of which is associated with a similar terminal, said terminals interconnected in at least one closed loop by transmission of N+1 frames of serial digital data which continuously circulate around said loop, each of said frames being identified with one and only one of said other programmable controllers, each of said frames being updated with information from each of the other N terminals in the loop as it makes one complete cycle of the loop and each of said frames updating the programmable controller associated therewith, said terminal comprising, in combination:

receiving means connected to said loop for receiving therefrom input frames of digital data containing one or more data bytes of information relating to programmable controllers in said loop, a control byte loaded with a number of data bits to represent a count, and an identification byte which appears at least twice in the frame and identifies the programmable controller which will receive the data byte of that data frame;

transmitting means connected to said loop for transmitting output frames of digital data thereto;

first buffer memory means for storing a frame of data;

first control means connected to said receiving means and first buffer memory means for transferring data from said receiving means to said first buffer memory means;

second buffer memory means connected to said associated programmable controller for delivering bytes of stored data which were originated by other programmable controllers thereto, the delivery of said stored data being under control of said associated programmable controller;

third buffer memory means connected to said associated programmable controller for receiving bytes of updated information therefrom for transmission to said other programmable controllers in output frames associated with said other programmable controllers;

second control means connected to said first and second buffer memory means for transferring bytes of data for said associated programmable controller from said first buffer memory means to said second buffer memory means when the received input frame of digital data is identified with said associated programmable controller;

third control means connected to said first and third buffer memory means for transferring bytes of data for said other programmable controllers from said third buffer memory means to said first buffer memory means when the received input frame of digital data is not identified with said associated programmable controller;

fourth control means connected to said first buffer memory means and said transmitting means for transferring data from said first buffer memory means to said transmitting means for transmission of N output frames not identified with said associated programmable controller, said output frames corresponding to said input frames updated with information for other programmable controllers, said fourth control means transmitting an output frame identified with said associated programmable controller to be updated by said other terminals;

box identification byte generating means for receiving box identification information stored in said programmable controller and generating an identification byte;

further control means for comparing said box identification byte to said data identification byte to enable said second control means to transfer data from said first buffer memory means to said second buffer memory means when said box identification bytes and said data identification bytes are identical and to enable said third control means to transfer data from said third buffer memory means to said first buffer memory means when said box identification byte and said data identification bytes are not identical;

first error checking means for comparing the identification bytes stored in said first buffer memory means and for generating a frame error indication when said identification bytes are not identical; error frame generating means responsive to said frame error indication generated by said first error checking means to effect substitution of an error frame having specified characteristics for said data frame prior to said transmitting means transmitting the data frame containing said frame error to said closed loop;

fifth control means responsive to said error frame checking means to prevent said second control means from transferring data from said data frame to said second buffer memory means when an error frame is stored in said first buffer memory means; and index means for clearing the count in said control byte when said control byte is part of a data frame having an identification byte corresponding to said associated programmable controller and for indexing the count stored in the control byte when said control byte is a part of a data frame having an identification corresponding to one of said other programmable controllers whereby said control byte is always less than N+1 when said loop is operating correctly.

10. The invention claimed in claim 9 wherein said terminal also includes:
monitor means for comparing the count in said control byte to a predetermined count and for converting the data frame to an error frame when said count exceeds said predetermined count to indicate that the programmable controller corresponding to the data frame is no longer active in said loop.

11. The invention claimed in claim 9 wherein said terminal also includes:
counter means; and
incrementing means for setting said counter means to zero each time said terminal receives a data frame with an identification byte corresponding to said associated programmable controller and for incrementing said counter means each time said terminal receives a data frame with an identification byte corresponding to one of said other programmable controllers.

12. The invention claimed in claim 10 wherein said terminal also includes:
six control means responsive to the count stored in said counter means for causing said terminal to convert the first error frame received into a frame with an identification byte corresponding to said programmable controller when said count indicates that no data frame having an identification byte corresponding to said associated programmable controller is present on said closed loop.

13. A loop digital data communications system comprising:
an electrical conductor forming at least one closed loop;
a plurality of programmable controllers;

a plurality of terminals, each one being operatively coupled to a corresponding one of said programmable controllers to transmit and receive data therefrom, each of said terminals connected in series relation in said loop for transmitting and receiving digital information signals comprising a plurality of data frames, each of which is identified with and carries information to be used only by a particular one of said plurality of terminals and the programmable controller to which it is operatively coupled, to and from said loop to permit communication between said programmable controllers, and wherein each terminal includes means for designating the terminal as a master or a slave and wherein one of said terminals is designated as a master and each of the others of said plurality of said terminals is designated as a slave and wherein means are provided in said master terminal for generating a plurality of synchronizing frames when said system is initially energized and transmitting said plurality of synchronizing frames sequentially to each of the slave terminals in said closed loop until said master terminal receives the first in said plurality of synchronizing frames from said closed loop and converts it to a data frame associated with said master terminal, and wherein each of said terminals includes means for modifying the first synchronizing frame received after receiving the data frame of said master terminal to identify the frame with the particular terminal receiving it and passing said frame and further synchronizing frames to the next adjacent terminal in said closed loop, said master designated terminal also including means for continuing to generate synchronizing frames until receiving a synchronizing frame from the last slave identified terminal in said loop, said means also operative to discontinue the generation of synchronizing frames by said master terminal after receipt of a synchronizing frame from said loop.

14. In a loop digital data communications system including an electrical conductor including at least one closed loop, N programmable controllers and N communications terminals, each of which is identified with one of said programmable controllers, said terminals connected in series relation in said loop for transmitting and receiving data frames to and from said loop, each of said N data frames identified with one and only one programmable controller and comprising several bytes of information including a box identification byte for uniquely identifying each box in said system, a control byte, and at least one data byte containing data for use by the programmable controller identified by said box identification byte, each of said communications terminals also being operatively coupled to a corresponding one of said programmable controllers to form a box; a communications terminal comprising:

a data bus;
a control bus;
an address bus connected to receive addresses from the programmable controller;
receiver means connected to said electrical conductor to receive a data frame therefrom and deliver said information to said data bus;
transmitter means connected to receive digital information signals from said data bus and also connected to said electrical conductor to transmit a data frame thereto;
first buffer memory means connected to said data bus, said address bus, and said control bus, to receive and store information from said receiver means and to receive and store information for said transmitter means;
second buffer memory means connected to said address bus, said control bus, and said data bus to receive information from data frames for transmission to the programmable controller operatively coupled to said particular communications terminal;
third buffer memory means connected to said data bus, said control bus, and said address bus to receive information from the programmable controller operatively coupled to said communications terminal which is to be transferred to other programmable controllers of said plurality of programmable controllers by inserting it in data frames identified with the other boxes in said closed loop; and
control logic connected to said data bus, said control bus, and said address bus to supervise the transmission of a received data frame from said receiver means to said first memory means and the transfer of data carried by the data frame to said second memory means when said data frame is identified with said communications terminal and for obtaining data from said third buffer memory means when said data frame is not identified with said communications terminal, wherein said control logic also includes first logic means for incrementing said control byte by a single count each time a data frame is received by a box having a box identification byte which does not correspond to the box identification byte of said data frame and also includes second logic means for reading said control byte and generating a fault frame when said control byte exceeds a predetermined number larger than the number of terminals which are present in said loop whereby correct operation of said loop digital data communications system can be verified.

15. The invention of claim 14 wherein said communications terminal control logic includes second logic means for resetting the count to zero when the data frame is received in the box which originated it.

* * * * *

UNITED STATES PATENT AND TRADEMARK OFFICE
CERTIFICATE OF CORRECTION

PATENT NO. : 4,354,226
DATED : October 12, 1982
INVENTOR(S) : Charles E. Flickinger and Richard C. Born It is certified that error appears in the above-identified patent and that said Letters Patent are hereby corrected as shown below:

Column 2, line 54, delete "the other" and insert --other--.

Column 11, line 29, delete "38" and insert --39--.

Column 11, line 35, delete "94" and insert --92--.

Column 16, line 61, delete "or" and insert --of--.

Column 18, line 56, delete "six" and insert --sixth--.

Signed and Sealed this

Twenty-first Day of December 1982

[SEAL]

Attest:

*Attesting Officer*

GERALD J. MOSSINGHOFF
*Commissioner of Patents and Trademarks*